US008191766B2

(12) United States Patent
Tomchek et al.

(10) Patent No.: US 8,191,766 B2
(45) Date of Patent: Jun. 5, 2012

(54) METHODS AND SYSTEMS FOR MANAGING MERCHANT IDENTIFIERS

(75) Inventors: Brad Michael Tomchek, St. Charles, MO (US); Janet Smith, Des Peres, MO (US); Shoon Ping Wong, St. Charles, MO (US)

(73) Assignee: MasterCard International Incorporated, Purchase, NY (US)

( * ) Notice: Subject to any disclaimer, the term of this patent is extended or adjusted under 35 U.S.C. 154(b) by 446 days.

(21) Appl. No.: 12/396,561

(22) Filed: Mar. 3, 2009

(65) Prior Publication Data

US 2009/0228365 A1 Sep. 10, 2009

Related U.S. Application Data

(60) Provisional application No. 61/033,578, filed on Mar. 4, 2008.

(51) Int. Cl.
*G06F 7/00* (2006.01)
*G06Q 40/00* (2006.01)

(52) U.S. Cl. ............. 235/376; 235/380; 705/21; 705/39

(58) Field of Classification Search .................. 235/375, 235/376, 380, 383; 705/10, 35, 21, 22, 26.1, 705/38, 39; 709/203, 217, 223
See application file for complete search history.

(56) References Cited

U.S. PATENT DOCUMENTS

| | | | |
|---|---|---|---|
| 5,870,473 A | 2/1999 | Boesch et al. | |
| 6,312,175 B1 * | 11/2001 | Lum | 400/472 |
| 6,658,568 B1 | 12/2003 | Ginter et al. | |
| 6,915,277 B1 | 7/2005 | Manchester et al. | |
| 7,028,187 B1 * | 4/2006 | Rosen | 713/175 |
| 7,069,244 B2 * | 6/2006 | Strayer et al. | 705/39 |
| 7,165,174 B1 | 1/2007 | Ginter et al. | |
| 7,263,506 B2 * | 8/2007 | Lee et al. | 705/38 |
| 7,349,871 B2 | 3/2008 | Labrou et al. | |
| 7,366,772 B2 * | 4/2008 | Arroyo et al. | 709/223 |
| 7,406,442 B1 * | 7/2008 | Kottmeier et al. | 705/35 |
| 7,412,424 B1 | 8/2008 | Tenorio et al. | |
| 7,419,094 B2 * | 9/2008 | Grear et al. | 235/380 |
| 7,774,274 B2 * | 8/2010 | Jones et al. | 705/39 |
| 7,878,394 B2 * | 2/2011 | Johnson | 235/380 |

(Continued)

OTHER PUBLICATIONS

PCT International Search Report and the Written Opinion of the International Searching Authority, PCT/US 09/36029 dated Apr. 30, 2009 (11 pages).

*Primary Examiner* — Andrew Joseph Rudy
(74) *Attorney, Agent, or Firm* — Armstrong Teasdale LLP

(57) ABSTRACT

A method and system for processing a merchant identification request from a private label payment card issuer is provided. The issuer is communicatively coupled to a multi-party payment card interchange that includes access to a database. The database stores a plurality of historical multi-party payment card transactions. The method includes transmitting a list of private label merchant locations from the issuer to the interchange wherein the list includes physical location information relating to the private label merchants listed, processing the list at the interchange by applying thereto an identification analysis including one of merchant matching only, test transaction only, and merchant matching plus test transaction, identifying at least one private label merchant location included within the list including associating a unique identifier with the at least one identified private label merchant location, and outputting the at least one identified private label merchant location with the associated unique identifier.

38 Claims, 9 Drawing Sheets

U.S. PATENT DOCUMENTS

| | | | |
|---|---|---|---|
| 7,925,652 B2 * | 4/2011 | Merz et al. | 707/727 |
| 7,945,514 B1 * | 5/2011 | Sanders et al. | 705/41 |
| 8,005,777 B1 * | 8/2011 | Owen et al. | 706/46 |
| 8,098,599 B2 * | 1/2012 | Ho et al. | 370/260 |
| 2003/0191715 A1 * | 10/2003 | Pinizzotto | 705/44 |
| 2004/0117300 A1 | 6/2004 | Jones et al. | |
| 2005/0021363 A1 * | 1/2005 | Stimson et al. | 705/1 |
| 2005/0192874 A1 * | 9/2005 | Grear et al. | 705/30 |
| 2005/0234817 A1 * | 10/2005 | VanFleet et al. | 705/40 |
| 2006/0006224 A1 | 1/2006 | Modi | |
| 2006/0253390 A1 | 11/2006 | McCarthy et al. | |
| 2008/0005018 A1 | 1/2008 | Powell | |
| 2008/0208760 A1 * | 8/2008 | Keithley | 705/75 |
| 2009/0171759 A1 * | 7/2009 | McGeehan | 705/10 |

* cited by examiner

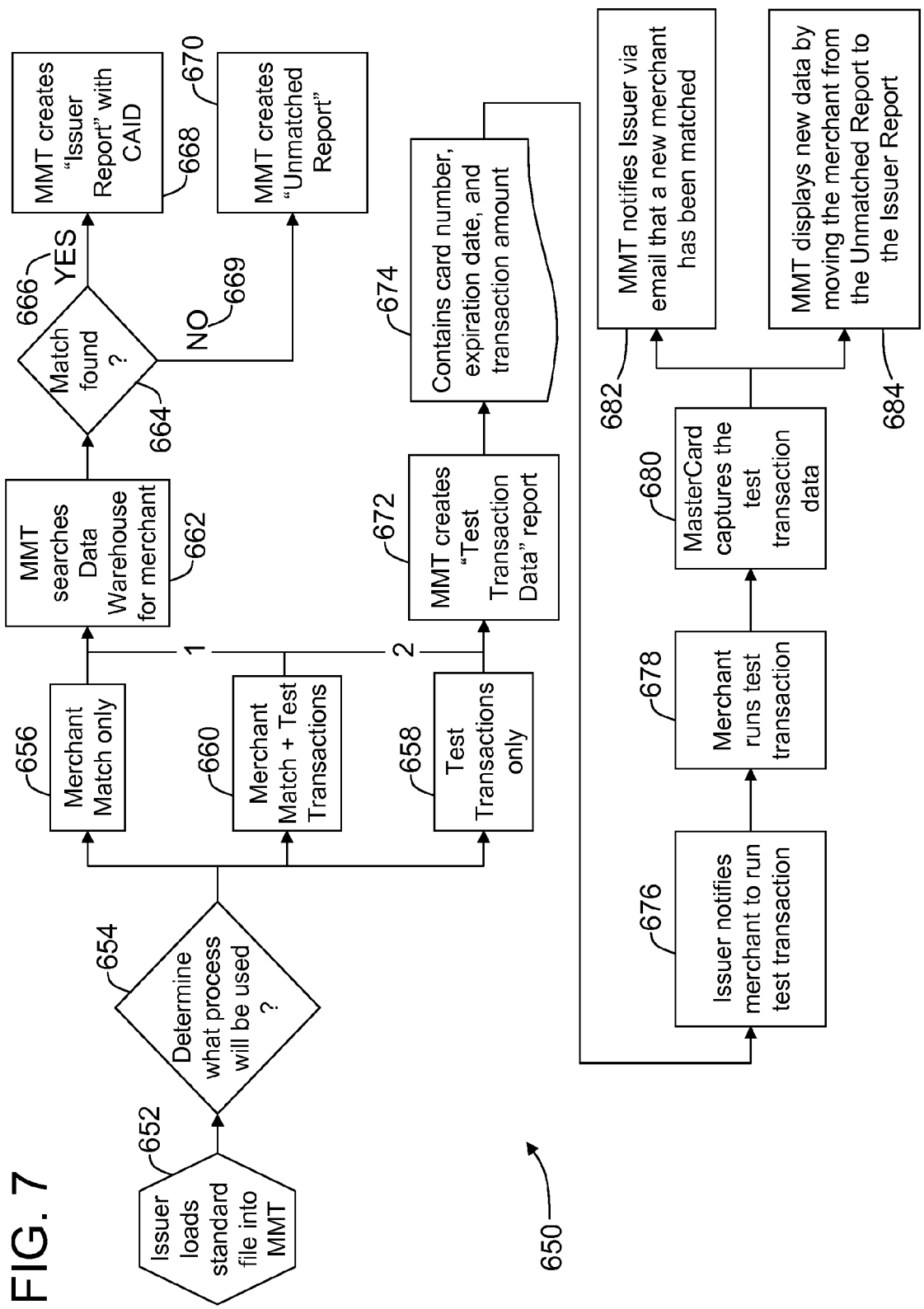

FIG. 9

*Private Label Program*

*Merchant Management Tool*

| Home | File Upload | Active Merchant Management | MMT Admin. | issuer 1
Change Issuer

Home > File Upload > MDF

Upload Merchant Data File: File Selection

Click here to download the file template — 802
* Field required

Upload File

*Unique File Name: [_____] — 804

Suggestion is to use a sequence number. The file will be stored by date. The name will be checked against file names used previously.

*MDF file to upload: [_____] [Browse]

MDF file format must be: CSV

*Select Type of Processing:
○ Merchant Match Only — 808
○ Merchant Match + Test Transaction Data — 810
⦿ Test Transaction Data Only — 812

This option will not perform any matching. A report will be provided that will include test transaction data for all merchants in the uploaded file.

*Notification List: [_____] — 814

Enter list of email addresses you wish to send completion notifications to separated by commas (up to 10 addresses).
*Note:* This may send up to one email per day per file uploaded depending on how quickly merchants initiate transactions.

[Upload] [Cancel]

— 800
— 806

METHODS AND SYSTEMS FOR MANAGING MERCHANT IDENTIFIERS

CROSS REFERENCE TO RELATED APPLICATIONS

This application claims the priority of Provisional Patent Application Ser. No. 61/033,578, filed Mar. 4, 2008, which is hereby incorporated by reference in its entirety.

BACKGROUND OF THE INVENTION

This invention relates generally to processing transactions associated with financial transaction card accounts and, more particularly, to network-based methods and systems for managing merchant identification during financial transaction card account processing.

At least some known merchants accept payment for goods and services using more than one type of financial transaction card systems. One type may be a multi-party transaction system where transactions are processed through a multi-party transaction system interchange. Another type may be a private label transaction system where merchants are directly communicatively coupled to a private label issuer for transaction processing. For example, some merchants accept Visa™, Mastercard™, Discover™, and/or American Express™ financial transaction cards. Some merchants also accept a private label financial transaction card, such as a Macy's™, Home Depot™, or other retail merchant card. Generally private label transaction systems are closed to transaction data being transmitted on the private label transaction systems that is not associated with a private label transaction. As such, less identification of the merchants and transaction information is required.

To facilitate processing, issuers may find switching their private label portfolio transactions through the multi-party transaction system interchange improves response times and/or cost benefits. Currently, merchants are typically directly connected to the issuers that manage their private label programs and transactions are processed in a closed-loop manner. Because of the closed nature of their current private label processing environment, issuers know that the transactions they receive come from a participating merchant. However, with a multi-party transaction system interchange, issuers need to ensure that a private label transaction is originating at a participating merchant location.

BRIEF DESCRIPTION OF THE INVENTION

In one aspect, a method of processing a merchant identification request from a private label payment card issuer is provided. The private label payment card issuer is communicatively coupled to a multi-party payment card interchange that includes access to a data warehouse and a merchant matching tool. The data warehouse stores a plurality of historical multi-party payment card transactions. The method includes transmitting a list of private label merchant locations from the private label payment card issuer to the multi-party payment card interchange wherein the list includes physical location information relating to the private label merchants listed, processing the private label merchant list at the merchant matching tool wherein the merchant matching tool is configured to apply an identification analysis including one of merchant matching only, test transaction only, and merchant matching plus test transaction, identifying at least one private label merchant location included within the private label merchant list including associating a unique identifier with the at least one identified private label merchant location, and outputting the at least one identified private label merchant location with the associated unique identifier.

In another aspect, a network-based system for processing a merchant identification request from a private label payment card issuer is provided. The system includes a point of sale (POS) device, a computer system associated with the private label payment card issuer, a database for storing a plurality of historical multi-party payment card transactions, and a server system configured to be coupled to the POS device, the computer system, and the database. The server system includes a merchant matching tool (MMT) and is associated with a multi-party payment card interchange. The server system is configured to receive a list of private label merchant locations from the issuer computer system wherein the list includes physical location information relating to the private label merchants listed, process the private label merchant list by applying an identification analysis thereto including one of a merchant matching only analysis, a test transaction only analysis, and merchant matching plus test transaction analysis, identify at least one private label merchant location included within the private label merchant list including associating a unique identifier with the at least one identified private label merchant location, and output the at least one identified private label merchant location with the associated unique identifier.

In another aspect, a computer program embodied on a computer readable medium for processing a merchant identification request from a private label payment card issuer is provided. The private label payment card issuer is communicatively coupled to a multi-party payment card interchange computer that is coupled to a data warehouse. The data warehouse is for storing a plurality of historical multi-party payment card transactions. The program is executed by the interchange computer and comprises at least one code segment that receives a list of private label merchant locations from the private label payment card issuer wherein the list includes physical location information relating to the private label merchants listed, processes the private label merchant list by applying an identification analysis thereto including applying one of a merchant matching only analysis, a test transaction only analysis, and merchant matching plus test transaction analysis, identifies at least one private label merchant location included within the private label merchant list including associating a unique identifier with the at least one identified private label merchant location, and outputs the at least one identified private label merchant location with the associated unique identifier.

In another aspect, a method of processing a merchant matching request from a private label payment card issuer is provided. The private label payment card issuer is communicatively coupled to a multi-party payment card interchange that includes access to a data warehouse of a plurality of historical multi-party payment card transactions and a merchant matching tool. The method includes transmitting a list of private label merchant locations by the private label payment card issuer to the multi-party payment card interchange wherein the list includes physical location information relating to the private label merchants listed. The method further includes retrieving records of historical multi-party payment card transactions, the records including physical location information for a merchant initiating each of the transactions and a unique identifier associated with the merchant and substantially matching physical location information of the private label merchants in the list with physical location information from the records of historical multi-party payment card transactions. The method also includes associating the unique identifier associated with the records of historical multi-party payment card transactions with a matching private label merchant location in the list and outputting the matching private label merchant locations and the unique identifier associated with the matched location.

In another embodiment, a network-based system for managing merchant identification in a cardholder-initiated financial transaction with a private label merchant using a private label merchant controlled input device in communication with a third party card network and a database is provided. The cardholder uses a private label payment card issued to the cardholder by the private label issuer bank. The system includes a database for storing information and a server system configured to receive data from the private label merchant controlled input device and to be coupled to the database. The server is further configured to receive private label merchant data from the private label issuer bank, the private label merchant data including a location of each of the private label merchants having a merchant controlled input device where a private label financial transaction can be initiated by a cardholder and locate in the database one or more records of historical cardholder-initiated financial transactions having a merchant location that substantially matches the received private label merchant data. The server is also configured to determine a unique merchant identifier using the records of historical cardholder-initiated financial transactions and verify the location of a merchant in a cardholder-initiated financial transaction using the determined unique merchant identifier.

In yet another embodiment, a method of managing merchant identification in a cardholder-initiated financial transaction with a private label merchant using a private label merchant controlled input device in communication with a third party card network and a database is provided. The cardholder uses a private label payment card issued to the cardholder by the private label issuer bank. The method includes receiving private label merchant data from the private label issuer bank, the private label merchant data including a location of each of the private label merchants having a merchant controlled input device where a private label financial transaction can be initiated by a cardholder and locating in the database one or more records of historical cardholder-initiated financial transactions having a merchant location that substantially matches the received private label merchant data. The method also includes determining a unique merchant identifier using the records of historical cardholder-initiated financial transactions and verifying the location of a merchant in a cardholder-initiated financial transaction using the determined unique merchant identifier.

In still another embodiment, a computer program embodied on a computer readable medium for processing a merchant matching request from a private label payment card issuer is provided. The private label payment card issuer is communicatively coupled to a multi-party payment card interchange that includes access to a data warehouse of a plurality of historical multi-party payment card transactions and a merchant matching tool. The program includes at least one code segment that receives a list of private label merchant locations from the private label payment card issuer, the list including physical location information relating to the private label merchants listed and retrieves records of historical multi-party payment card transactions, the records including physical location information for a merchant initiating each of the transactions and a unique identifier associated with the merchant. The program also includes at least one code segment that substantially matches physical location information of the private label merchants in the list with physical location information from the records of historical multi-party payment card transactions, associates the unique identifier associated with the records of historical multi-party payment card transactions with a matching private label merchant location in the list, and outputs the matching private label merchant locations and the unique identifier associated with the matched location.

BRIEF DESCRIPTION OF THE DRAWINGS

FIGS. 1-9 show exemplary embodiments of the methods and systems described herein.

FIG. 1 is a schematic diagram of an exemplary private label card account payment environment that includes a point of interaction controlled by a private label merchant, a card issuer or issuing bank, and a transaction processor interconnecting point of interaction and card issuer;

FIG. 2 is a schematic diagram illustrating an exemplary multi-party payment card industry system for enabling ordinary payment-by-card transactions in which merchants and card issuers do not necessarily have a one-to-one relationship;

FIG. 3 is a simplified block diagram of an exemplary system in accordance with one embodiment of the present invention;

FIG. 4 is an expanded block diagram of an exemplary embodiment of a server architecture of a system in accordance with one embodiment of the present invention;

FIG. 5 is a block diagram of a network configuration implementing a merchant management system in accordance with an exemplary embodiment of the present invention;

FIG. 6 is a data flow diagram of an exemplary implementation of a portion of a merchant management tool (MMT) as shown in FIG. 5;

FIG. 7 is a flow diagram illustrating exemplary processes utilized by the merchant management system shown in FIG. 5;

FIG. 8 is an exemplary user interface for initiating a merchant matching process that may be used with the MMT shown in FIG. 5; and FIG. 9 is an exemplary user interface for providing information to the merchant matching process that may be used with the MMT shown in FIG. 5.

DETAILED DESCRIPTION OF THE INVENTION

The following detailed description illustrates embodiments of the invention by way of example and not by way of limitation. It is contemplated that the invention has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
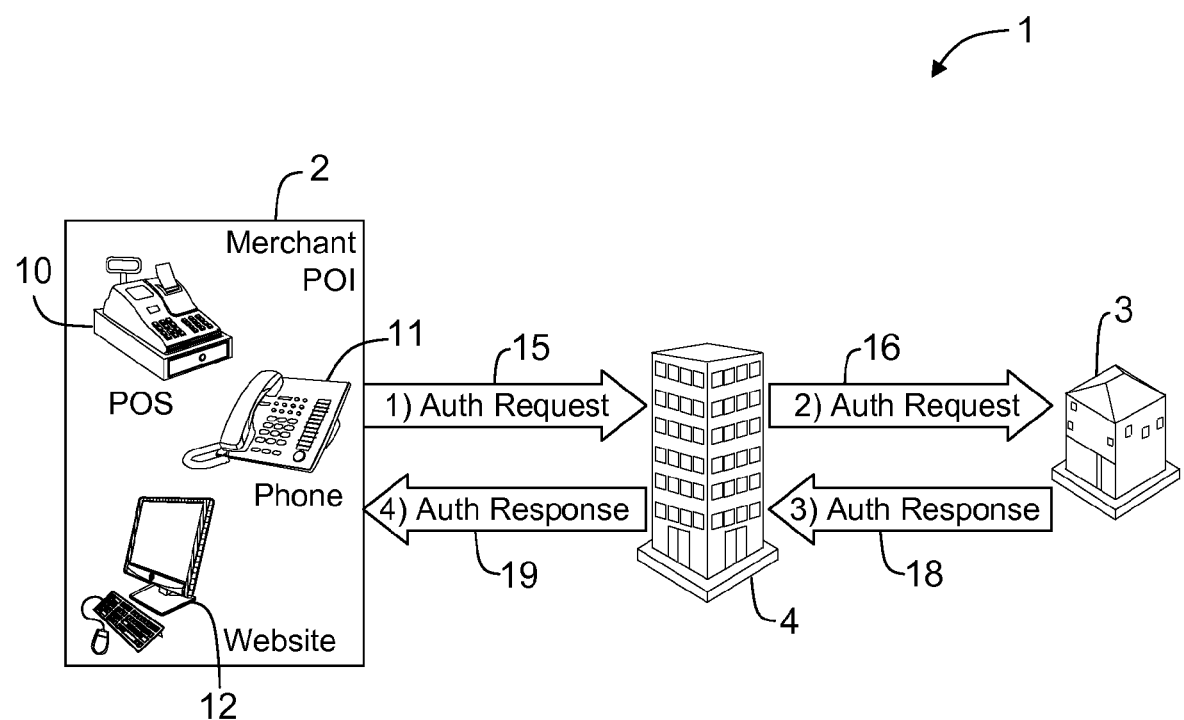

FIG. 1 is a schematic diagram of an exemplary private label card account payment environment 1 that includes a point of interaction 2 controlled by a private label merchant, a card issuer or issuing bank 3, and a transaction processor 4 interconnecting point of interaction 2 and card issuer 3. The merchant's point of interaction 2 generally includes one or more of a point of sale device 10, a telephone 11, and/or a merchant website 12, through which authorization requests are initiated.

More specifically, a merchant authorization request 15 is generated at the merchant's point of interaction 2 which is sent to the transaction processor 4 and forwarded to the card issuer 3 as a request for authorization 16. Upon verifying a status of the cardholder account, the card issuer 3 responds to the transaction processor 4 with an authorization response 18 which is received by the transaction processor 4 and forwarded to the merchant's point of interaction 2 as an authorization response to merchant 19.

In regard to the card account payment environment 1, a cardholder's account number is entered into the merchant's environment with which the cardholder is doing business, in order to obtain the authorization. As described above, this conventionally includes one or more of the cardholder giving his card to a merchant to swipe or key into the merchant point of sale device 10, the cardholder or merchant initiating a phone call from telephone 11 to enter a card account number, the cardholder himself swiping his card in the merchant's point of sale device 10, or the merchant or cardholder entering the account number associated with the financial transaction card into the merchant's website 12. Payments for approved transactions are managed with the card issuer 3 or merchant's acquirer (not shown in FIG. 1) based on the specific card payment network or other closed loop environment. In the exemplary embodiment, private label card account payment environment 1 generally includes point of interaction 2, card issuer 3, and transaction processor 4 in a closed communication network such that authorization requests 15 and 16 remain within private label card account payment environment 1 and authorization responses 18 and 19 also remain within private label card account payment environment 1.

Figure 2:
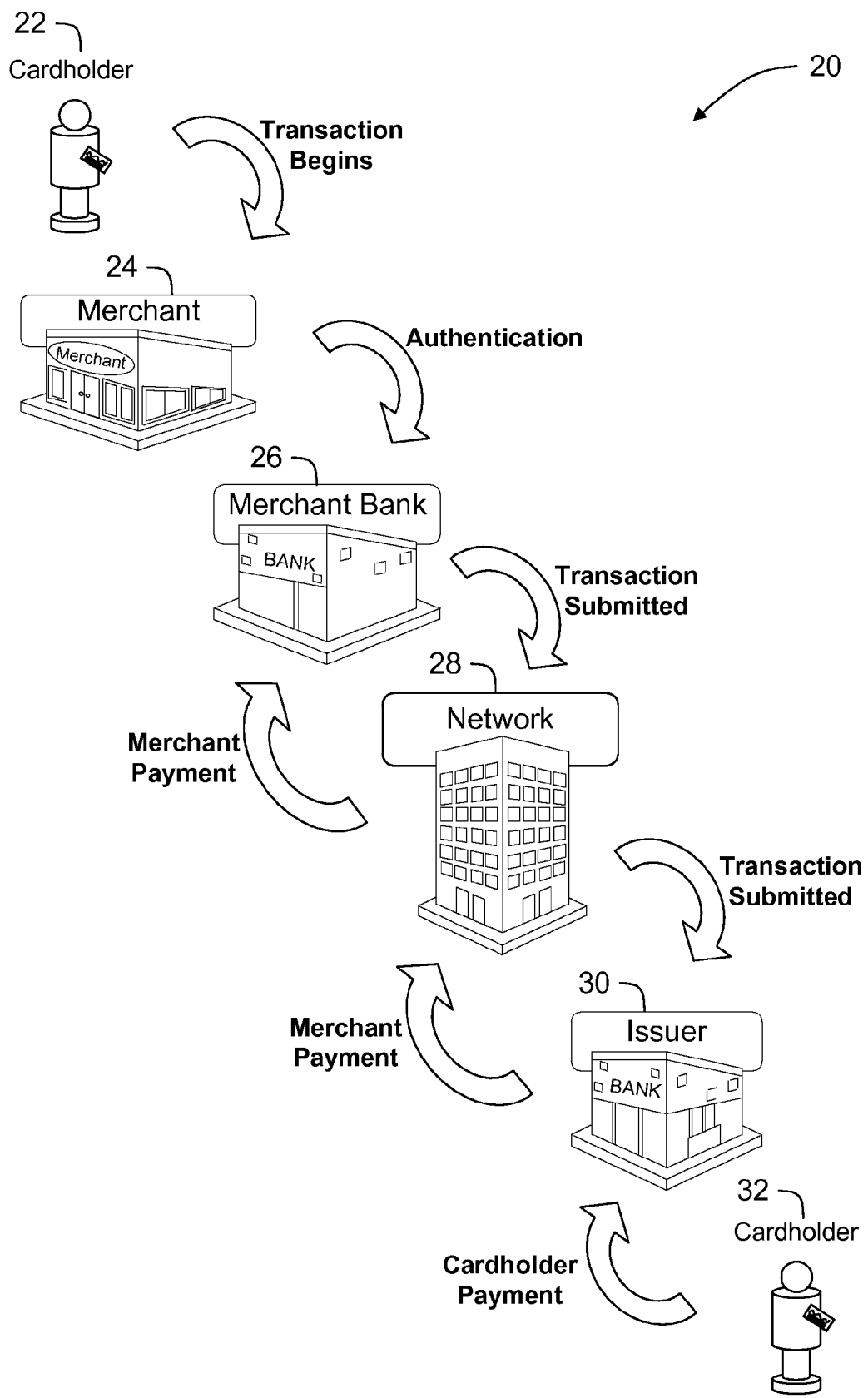

FIG. 2 is a schematic diagram 20 illustrating an exemplary multi-party payment card industry system for enabling ordinary payment-by-card transactions in which merchants and card issuers do not necessarily have a one-to-one relationship. The present invention relates to a payment card system, such as a credit card payment system using the MasterCard® interchange. The MasterCard® interchange is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

In a typical payment card system, a financial institution called the "issuer" issues a payment card, such as a credit card, to a consumer, who uses the payment card to tender payment for a purchase from a merchant. To accept payment with the payment card, the merchant must normally establish an account with a financial institution that is part of the financial payment system. This financial institution is usually called the "merchant bank" or the "acquiring bank" or "acquirer bank." When a consumer 22 tenders payment for a purchase with a payment card (also known as a financial transaction card), the merchant 24 requests authorization from the merchant bank 26 for the amount of the purchase. The request may be performed over the telephone, but is usually performed through the use of a point-of-sale terminal, which reads the consumer's account information from the magnetic stripe on the payment card and communicates electronically with the transaction processing computers of the merchant bank. Alternatively, a merchant bank may authorize a third party to perform transaction processing on its behalf. In this case, the point-of-sale terminal will be configured to communicate with the third party. Such a third party is usually called a "merchant processor" or an "acquiring processor."

Using the interchange 28, the computers of the merchant bank or the merchant processor will communicate with the computers of the issuer bank 30 to determine whether the consumer's account is in good standing and whether the purchase is covered by the consumer's available credit line. Based on these determinations, the request for authorization will be declined or accepted. If the request is accepted, an authorization code is issued to the merchant.

When a request for authorization is accepted, the available credit line of consumer's account 32 is decreased. Normally, a charge is not posted immediately to a consumer's account because bankcard associations, such as MasterCard International Incorporated®, have promulgated rules that do not allow a merchant to charge, or "capture," a transaction until goods are shipped or services are delivered. When a merchant ships or delivers the goods or services, the merchant captures the transaction by, for example, appropriate data entry procedures on the point-of-sale terminal. If a consumer cancels a transaction before it is captured, a "void" is generated. If a consumer returns goods after the transaction has been captured, a "credit" is generated.

For debit card transactions, when a request for a PIN authorization is approved by the issuer, the consumer's account 32 is decreased. Normally, a charge is posted immediately to a consumer's account. The bankcard association then transmits the approval to the acquiring processor for distribution of goods/services, or information or cash in the case of an ATM.

After a transaction is captured, the transaction is settled between the merchant, the merchant bank, and the issuer. Settlement refers to the transfer of financial data or funds between the merchant's account, the merchant bank, and the issuer related to the transaction. Usually, transactions are captured and accumulated into a "batch," which are settled as a group.

Financial transaction cards or payment cards can refer to credit cards, debit cards, and prepaid cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), and key fobs.

Figure 3:
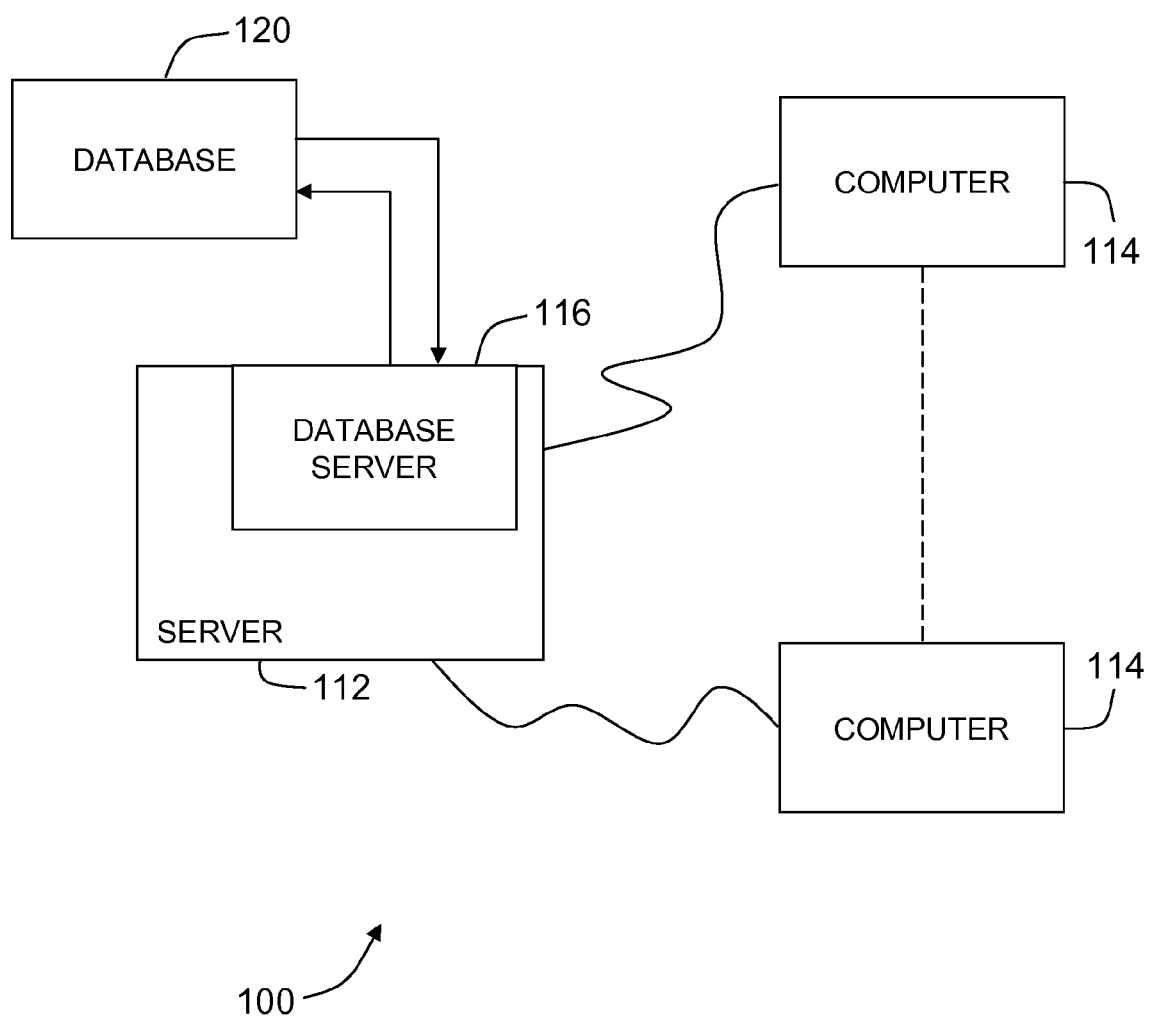

FIG. 3 is a simplified block diagram of an exemplary system 100 in accordance with one embodiment of the present invention. System 100 is a payment card system, which can be utilized by account holders as part of a process of initiating an authorization request and transaction as described below.

More specifically, in the example embodiment, system 100 includes a server system 112, and a plurality of client subsystems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems and special high-speed ISDN lines. Client systems 114 could be any device capable of interconnecting to the Internet including a web-based phone, personal digital assistant (PDA), or other web-based connectable equipment. A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized. Database 120 may store transaction data generated as part of sales activities conducted over the bankcard network including data relating to merchants, account holders or customers, and purchases.

Figure 4:
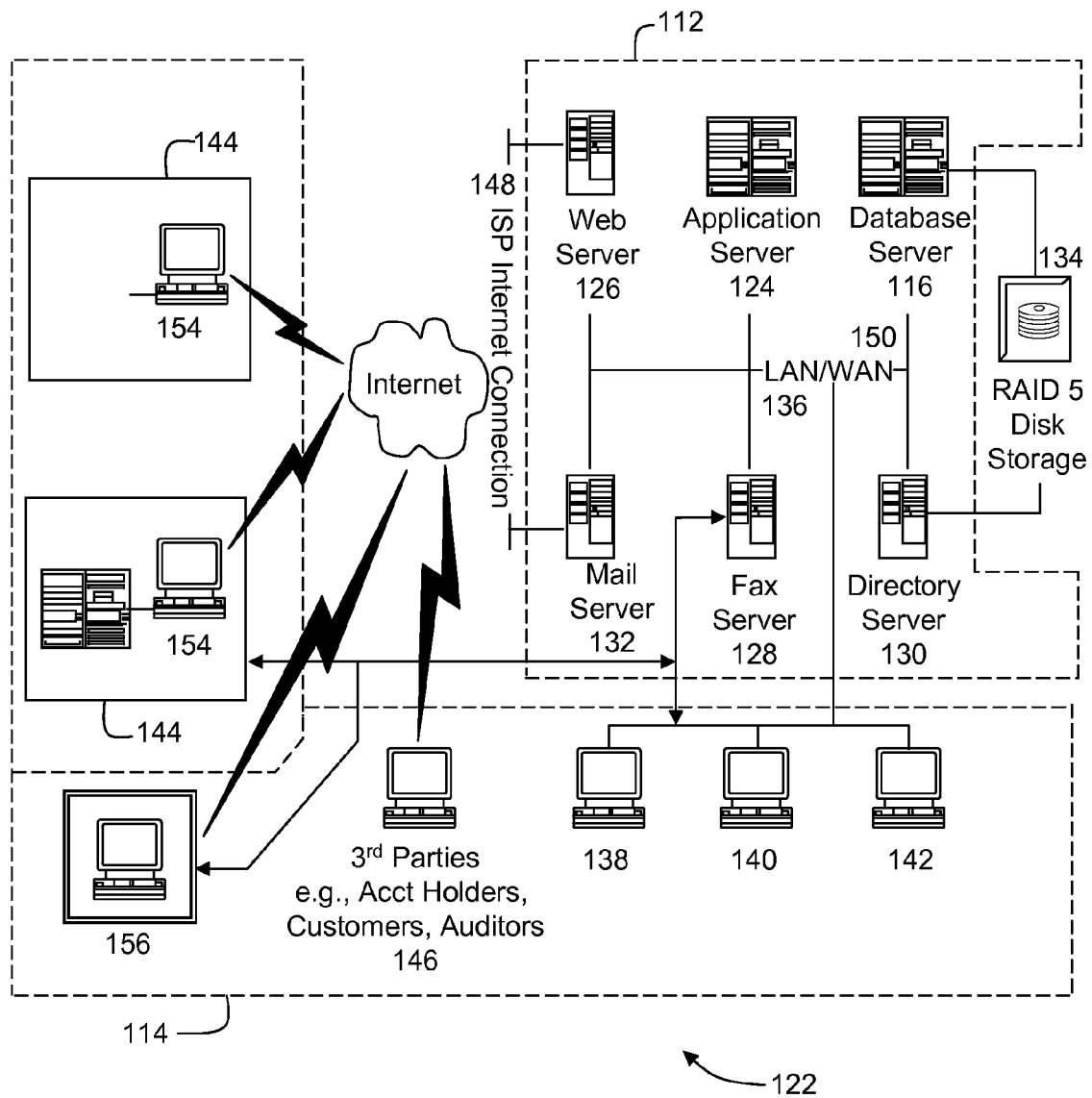

FIG. 4 is an expanded block diagram of an exemplary embodiment of a server architecture of a system 122 in accordance with one embodiment of the present invention. Components in system 122, identical to components of system 100 (shown in FIG. 3), are identified in FIG. 4 using the same reference numerals as used in FIG. 3. System 122 includes server system 112 and client systems 114. Server system 112 further includes database server 116, an application server 124, a web server 126, a fax server 128, a directory server 130, and a mail server 132. A disk storage unit 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, etc., 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

As used herein, the terms "software" and "firmware" are interchangeable, and include any computer program stored in memory for execution by personal computers, workstations, clients and servers, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 5:
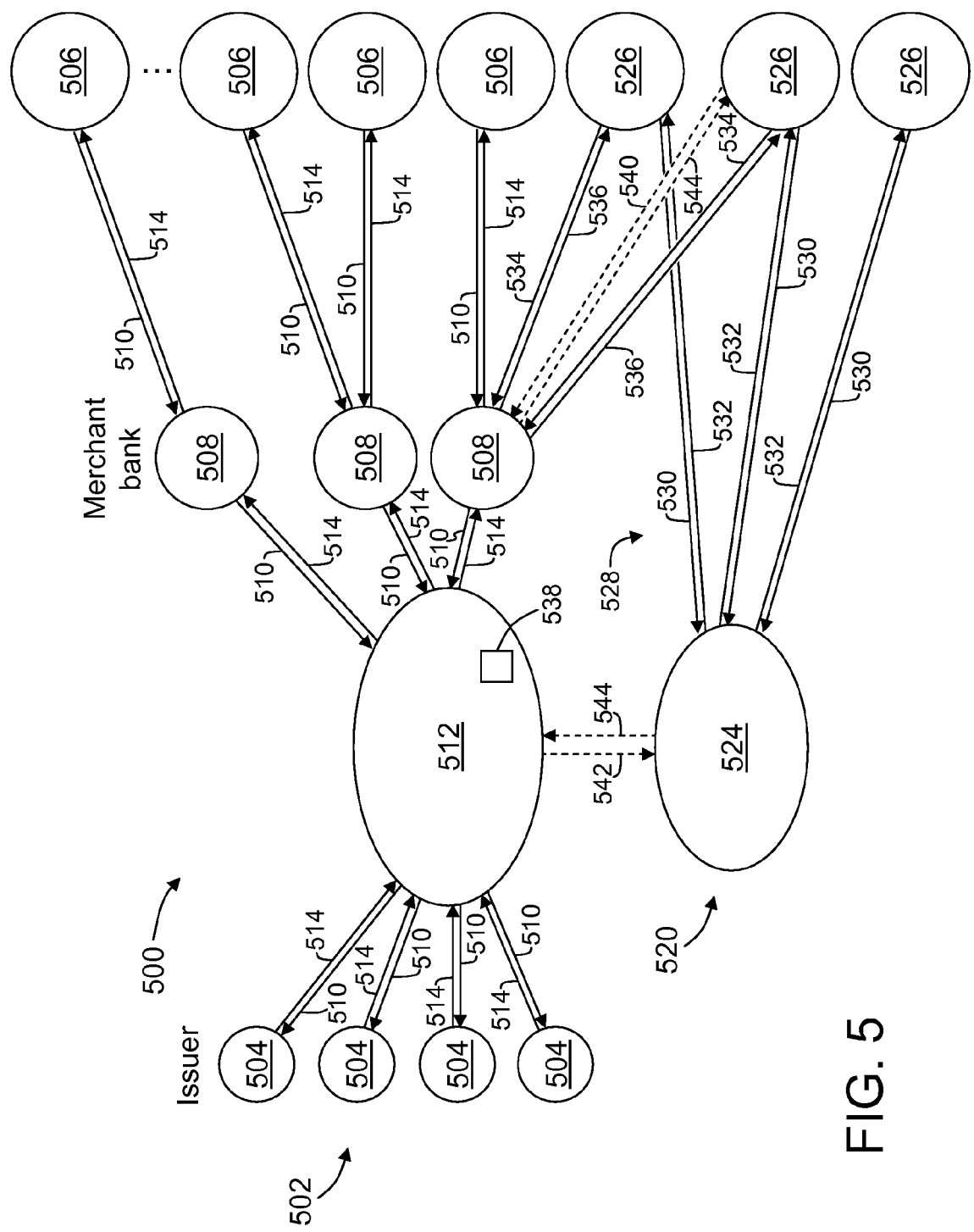

FIG. 5 is a schematic block diagram of a network configuration 500 implementing a merchant management system in accordance with an exemplary embodiment of the present invention. In the exemplary embodiment, a multi-party payment card system 502 includes one or more issuer financial institutions 504 that issue a payment card, such as a credit card, to a consumer, who uses the payment card to tender payment for a purchase from a plurality of merchants 506. A merchant bank 508 permits merchant 506 to accept payment with the payment card though an account established with merchant bank 508. Merchant bank 508 is normally a financial institution that is part of payment card system 502. When a consumer tenders payment for a purchase with a payment card (also known as a financial transaction card), merchant 506 transmits an authorization request 510 to merchant bank 508 for the amount of the purchase.

Computers of merchant bank 508 communicate with computers of issuer bank 504 through an interchange 512 to determine whether the consumer's account is in good standing and whether the purchase is covered by the consumer's available credit line. Based on these determinations, authorization request 510 may be declined or accepted. If the request is accepted, an authorization code is issued to the merchant. An authorization response 514 is transmitted back to the requesting merchant 506 to complete the transaction.

Network configuration 500 also includes a closed loop private label payment card system 520 that includes one or more issuer financial institutions 524 that issue a payment card, such as a credit card, to a consumer, who uses the payment card to tender payment for a purchase from a plurality of merchants 526.

In contrast to multi-party payment card system 502 closed loop private label payment card system 520, issuers 524 are directly connected to their partner merchants 526 to process private label transactions using a proprietary network 528. In the private label payment card system 520, the private label transactions received by issuers 524 must originate at the known locations of participating partner merchants 526. For example, an authorization request 530 must be initiated from a partner merchant 526 because partner merchants 526 are the only merchants permitted to be connected to private label network 528. Issuers 524 transmit authorization responses 532 to merchants 526 using private label network 528.

At least some merchants 526 also accept multi-party payment cards that are processed through an associated merchant bank 508. For example, an authorization request 534 is transmitted from merchant 526 to merchant bank 508 to be processed through interchange 512 by issuers 504. Issuers 504 transmit authorization responses 536 to merchants 526 using interchange 512.

In accordance with various embodiments of the present invention, private label transactions maybe processed using interchange 512 rather than between merchants 526 and issuer 524 directly. Using interchange 512 provided by the third party private label program, issuers 524 do not connect directly to their partner merchants 526 through network 528; however, issuers 524 will need to verify that the private label transaction they receive originated from a participating merchant 526.

A merchant management tool (MMT) 538 provides issuers 524 with a mechanism to uniquely identify the identity of each participating merchant 526. As explained below in greater detail, MMT 538 enables issuers 524 to obtain the unique merchant identification numbers (card acceptor IDs) that accompany authorization requests 534 and clearing messages originating from participating merchants 526.

Issuers 524 upload a file of participating private label merchant data into MMT 538, which then automates the unique identifier extraction process. At the completion of extraction processing, issuers 524 are provided the unique merchant identifiers for each of issuer's 524 private label merchants 526. Upon receipt of these merchant identifiers, issuers 524 are able to integrate the unique identifier information into their issuer processing platform. This unique identifier information provides validation that a private label transaction processed via interchange 512 originates from a participating private label merchant 526.

In the exemplary embodiment, issuers 524 are not directly connected to associated partner merchants 526 for processing private label transactions using proprietary network 528, but rather interchange 512 and the third party's network system are used to receive financial transaction information. For example, instead of transmitting authorization request 530 to issuer 524 directly, merchants 526 transmit an authorization request 540 to merchant bank 508 or to interchange 512. In one embodiment, after the unique identifier for the merchant 526 location that originated authorization request 540 is determined by MMT 538, an authorization request 542 that includes the determined unique identifier is transmitted to issuer 524. Issuer 524 verifies the unique identifier corresponds to a merchant 526 authorized to accept private label cards. An authorization response 544 is transmitted back to interchange 512 and then to merchant 526 to complete the transaction.

Figure 6:
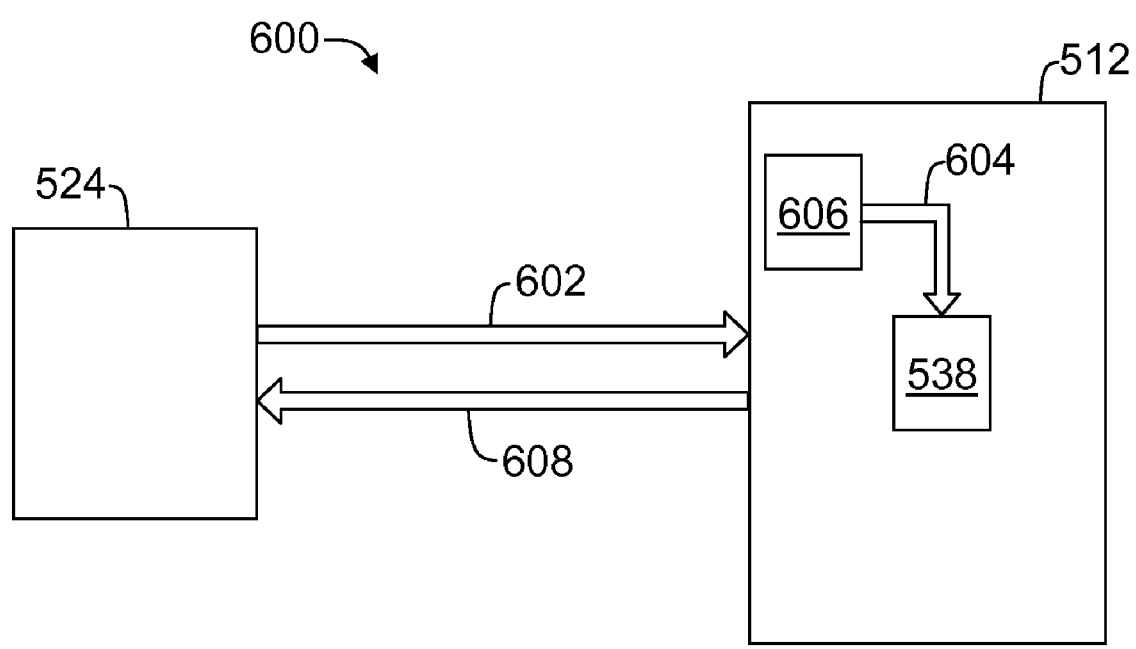

FIG. 6 is a data flow diagram 600 of an exemplary implementation of a portion of merchant management tool (MMT) 538. In the exemplary embodiment, private label issuer 524 transmits a list 602 of participating merchant information relating to a location of each participating merchant to interchange 512. The information in list 602 includes, for example, but not limited to, a name of the participating private label merchant and an address including a zip code. The information is received by interchange 512 and processed by MMT 538. MMT 538 also receives historical transaction information 604 from a data warehouse 606 owned and maintained by interchange 512. In the exemplary embodiment, data warehouse 606 is illustrated as being a part of interchange 512. In various other embodiments, data warehouse 606 is located away from interchange 512. Historical transaction information 604 includes information for transactions that have occurred at multi-party card accepting merchant locations all over the world.

In the example embodiment, MMT 538 is configured to identify each merchant provided within list 602 and provide a card acceptor identification (CAID) for each of these identified merchants, or identify the merchant as an "unmatched merchant" in those cases where MMT 538 is unable to identify the merchant. MMT 538 is configured to identify the merchants by using (1) a merchant match only analysis, (2) a test transaction only analysis, and/or (3) a combination of the merchant match analysis and the test transaction analysis.

In the merchant match only analysis, MMT 538 compares the merchant location information in list 602 to every multi-party card accepting location included in historical transaction information 604. Using the comparison, MMT 538 identifies a correct location for private label merchant 526 (shown in FIG. 5) based on the address and/or zip code of that merchant location from list 602. When a match between an address for a private label card accepting merchant provided in list 602 and an address for a multi-party card accepting merchant located in data warehouse 606 is identified, MMT 538 retrieves a unique identifier in historical transaction information 604, which is referred to as a card acceptor identification (CAID). For example, MMT 538 can match abbreviations with a fully spelled word, such as "N." and "North" or "Ave." and "Avenue". Additionally, MMT 538 can match place names that do not correspond exactly with a zip code. In this way MMT 538 substantially matches location information such as addresses of merchant locations. For those merchants that cannot be matched by MMT 538, MMT 538 creates an "Unmatched Report" that can be used for manual processing.

The unique identifier (i.e., CAID) is an identifier that was assigned to that merchant location by the location's merchant bank 508 (shown in FIG. 5). The unique identifier is used in multi-party transactions to uniquely identify each merchant location in multi-party payment card system 502. The unique identifier is not used in private label payment card system 520 because issuer 524 already knows the merchant locations from which it should expect to receive transactions. In the case where interchange 512 is used to at least partially process private label transactions, issuer 524 needs to verify that transactions it receives are really from merchants 526 that are allowed to make private label transactions.

After MMT 538 matches all the merchant location information in list 602 to multi-party card accepting locations included in historical transaction information 604, MMT 538 generates an Issuer Report 608 showing the CAIDs that are associated with each of the merchant locations provided in list 602. In the exemplary embodiment, report 608 is transmitted to issuer 524 for their use in verifying the unique identifier that they should expect to see on a future transaction that originated from a participating private label merchant location. Verification includes determining that a private label card was in fact used for initiating a transaction at a private label merchant associated with that particular card and not at a merchant that is not authorized to accept the private label card or a merchant associated with a different private label card.

In the test transaction only analysis, MMT 538 identifies each merchant included within list 602 by creating test transaction data for each merchant. The test transaction data includes a transaction card number, an expiration date and a transaction amount. The test transaction data is provided from MMT 538 to private label issuer 524. Private label issuer 524 notifies each merchant included on list 602 requesting that each merchant process a test transaction using the test transaction data provided by MMT 538. For example, merchants 526 processes a test transaction by sending the test transaction data including a test authorization request from merchant 526 to merchant bank 508 to be processed through interchange 512. Interchange 512 captures the test transaction data including an identification of merchant 526. The test transaction data is then voided or declined by interchange 512 with a "Do Not Honor" response. By using the test transaction analysis, MMT 538 is able to identify each private label merchant 526 included on list 602, and MMT 538 is able to retrieve the unique identifier (CAID) for each of these merchants. For those merchants that cannot be identified using the test transaction analysis, MMT 538 creates an "Unmatched Report" that can be used for manual processing.

In the test transaction analysis, transaction card numbers are generated in random order by MMT 538. Card numbers are configured to expire within 30 days after the numbers are provided to the private label issuer by MMT 538. A card number will not be re-used by MMT 538 unless it has been "inactive" for at least 7 months. After a card number has been inactive for at least 7 months (or some other predetermined period of time), MMT 538 may be configured to include such inactive card numbers into the pool of card numbers that is being used for the random generation of card numbers. In the example embodiment, a test transaction bank identification number (BIN) is profiled as an interchange BIN. Test transactions transmitted to interchange 512 will be declined with a "Do Not Honor" response.

After MMT 538 identifies the merchants included on list 602 using the test transaction data, MMT 538 generates Issuer Report 608 showing the CAID that is associated with each of the merchant locations provided in list 602. In the exemplary embodiment, report 608 is transmitted to issuer 524 for their use in verifying the unique identifier that they should expect to see on a future transaction that originated from a participating private label merchant location. Verification includes determining that a private label card was in fact used for initiating a transaction at a private label merchant associated with that particular card and not at a merchant that is not authorized to accept the private label card or a merchant associated with a different private label card.

In the combination analysis, MMT 538 uses both the merchant match analysis and the test transaction analysis for identifying each merchant included within list 602. In one embodiment, MMT 538 uses the merchant match analysis to identify as many merchants as possible on list 602, and uses the test transaction analysis for those merchants that cannot be identified using the merchant match analysis. In other embodiments, one or both of these analyses are used to identify the merchants based on the information available for such identification.

FIG. 7 is a flowchart 650 illustrating exemplary processes utilized by merchant management tool (MMT) 538 for identifying private label merchants processing transactions over a multi-party payment card system. In the exemplary embodiment, private label issuer 524 uploads 652 a computer file to MMT 538. The computer file includes list 602 of private label participating merchant information relating to a location of each participating merchant. The information in list 602 includes, for example, but not limited to, a name of the participating private label merchant and an address including a zip code. The information is received by interchange 512 and processed by MMT 538. After uploading 652, MMT 538 automatically determines 654 which identification analysis will be used for identifying each merchant included within list 602. The identification analyses include at least one of a merchant match only analysis 656, a test transaction only analysis 658, and a merchant match plus test transaction analysis 660. The type of analysis applied may be preselected by interchange 512 or may be selected by issuer 524 at the time issuer 524 is uploading 652 the computer file to interchange 512.

In the case where MMT 538 uses merchant match only analysis 656, MMT 538 searches 662 historical transaction information stored within data warehouse 606 for each merchant included within list 602 to determine 664 whether a match exists between the merchant location information in list 602 to every multi-party card accepting location included in historical transaction information 604 stored within data warehouse 606. If a match exists 666, then MMT 538 creates 668 an Issuer Report, which includes a list of the identified merchants with their location and a corresponding card acceptor identification (CAID). The CAID is an identifier that is unique to each merchant. If a match does not exist 668, then MMT 538 creates 670 an "Unmatched Report" that can be used for manual processing.

In the case where MMT 538 uses test transaction only analysis 658, MMT 538 generates 672 a test transaction data report, which includes generating 674 test transaction data for each merchant included within list 602 that has been designated for processing using the test transaction analysis. MMT 538 generates 674 test transaction data including a transaction card number, an expiration date and a transaction amount. The test transaction data is provided from MMT 538 to private label issuer 524. Private label issuer 524 then notifies 676 each merchant included on the test transaction data report and requests that each merchant run 678 a test transaction using the test transaction data provided by MMT 538. The merchant will run the test transaction data using their point of sale (POS) device. When a merchant runs 678 the test transaction, the test transaction data is transmitted from the merchant POS to interchange 512, and more specifically, to MMT 538, wherein MMT 538 captures 680 the test transaction data.

In the example embodiment, the captured test transaction data includes the CAID associated with the merchant's POS that processed the test transaction data. Accordingly, when MMT 538 captures 680 the test transaction data, MMT 538 has identified the merchant because MMT 538 has also captured the CAID for that particular merchant. MMT 538 then notifies 682 issuer 524 via email that a new merchant has been matched, and displays 684 new data by moving the merchant from the Unmatched Report to the Issuer Report.

For example, when using the test transaction analysis, each merchant 526 included within the test transaction data report processes a test transaction using their point of sale (POS) device. The transaction may be for a nominal amount of money (e.g., $1.00 or $5.00). The test transaction also uses the transaction card number provided by MMT 538. In the example embodiment, the bank identification number (BIN) is profiled as an interchange BIN. More specifically, in the case of the test transactions, the BIN is the first six (6) digits of the test transaction card number. Accordingly, when the test transaction is run by the merchant at their POS, an authorization request is transmitted to the interchange which includes at least the test transaction card number, the BIN, the transaction amount, the expiration date and the CAID associated with the merchant's POS. The interchange is then able to detect that the transaction is a test transaction either by (1) matching the transaction card number from the authorization request to the test transaction card number generated by the MMT and provided to the merchant, (2) comparing the BIN from the authorization request to the interchange BIN profile, or (3) detecting the transaction amount and then matching the transaction card number as described in item (1) or comparing the BIN as described in item (2). Once the test transaction is detected, the MMT is able to identify the merchant by capturing the CAID for the merchant from the POS used for processing the transaction, and voids the transaction with a "Do Not Honor" response.

By using the test transaction analysis, MMT 538 is able to identify each private label merchant 526 included on list 602, and MMT 538 is able to retrieve the unique identifier (CAID) for each of these merchants. In most cases using the test transaction analysis, MMT 538 is able to identify each merchant that processes the test transaction data. In those rare cases where MMT 538 is unable to identify the merchant, MMT 538 creates an "Unmatched Report" that can be used for manual processing.

In the case where MMT 538 uses merchant match plus test transaction analysis 660, MMT 538 typically first searches 662 historical transaction information stored within data warehouse 606 for each merchant included within list 602 to determine 664 whether a match exists between the merchant location information in list 602 to every multi-party card accepting location included in historical transaction information 604 stored within data warehouse 606. If a match exists 666, then MMT 538 identifies the merchant with a location and a CAID in an Issuer Report. For those merchants that are not identified using the merchant match analysis, MMT 538 then uses the test transaction analysis as described above to identify these initially unmatched merchants.

After MMT 538 identifies the merchants included on list 602 using any of the identification analyses, MMT 538 generates Issuer Report 608 showing the CAID that is associated with each of the merchant locations provided in list 602. In the exemplary embodiment, report 608 is transmitted to issuer 524 for their use in verifying the unique identifier that they should expect to see on a future transaction that originated from a participating private label merchant location. Verification includes determining that a private label card was in fact used for initiating a transaction at a private label merchant associated with that particular card and not at a merchant that is not authorized to accept the private label card or a merchant associated with a different private label card.

FIG. 8 is an exemplary embodiment of user interface 700 for initiating a merchant matching process that may be used with MMT 538 (shown in FIG. 5). MMT 538 enables issuers 524 to obtain from interchange 512 the unique merchant identification numbers (CAIDs) that will accompany authorization requests and clearing messages originating from participating private label merchants 526. To provide these unique merchant identifiers, issuers 524 upload into MMT 538, a list of merchants that will be participating in their private label program. MMT 538 then performs at least one identification analysis for identifying each merchant included within list 602. The identification analyses include at least one of a merchant match only analysis, a test transaction only analysis, and a merchant match plus test transaction analysis.

In the merchant match analysis, MMT 538 matches issuer 524 merchant list to unique multi-party card accepting locations profiled within data warehouse 606. In the exemplary embodiment, MMT 538 parses the physical location information of the private label merchants in the list and parses the physical location information from the records of historical multi-party payment card transactions, and intelligently matches corresponding fields in the respective information. MMT 538 compares the matching and non-matching fields to a predetermined match threshold and flags those private label merchants in the list having physical location information that matches the physical location information from the records of historical multi-party payment card transactions less than the predetermined match threshold.

Once MMT 538 completes the merchant matching process it determines the unique merchant identifiers assigned by the merchant's bank by interrogating historical transaction data stored data warehouse 606 for each merchant location. Upon completion of the interrogation of historical data, MMT 538 reports each merchant's unique identifiers.

In the test transaction analysis, MMT 538 generates test transaction data for each merchant included within list 602 that has been designated for processing using the test transaction analysis. The test transaction data is provided from MMT 538 to private label issuer 524. Private label issuer 524 requests that each merchant run a test transaction using the test transaction data provided by MMT 538. When the merchant runs the test transaction, the test transaction data is transmitted from the merchant POS to interchange 512. MMT 538 captures the test transaction data including the CAID for the merchant, and is then able to identify the merchant. Upon completion of the test transaction process, MMT 538 reports each merchant's unique identifiers.

In the merchant match plus test transaction analysis, MMT 538 performs a combination of the merchant matching process and the test transaction process in order to identify the merchants included within list 602.

To initiate the unique merchant identifier extraction process, issuers 524 complete the following steps:

Log into MMT 538. Upon successful login MMT 538 presents users with an MMT user interface 700. The user then selects a file upload navigation button 702. User interface 700 also includes a processing status section 704, which includes several columns of information including a file name, a status, a date submitted, a reports available, and a test transaction expiration. The test transaction expiration is displayed if the uploaded data file calls for test transaction processing.

Upon successful selection of file upload navigation button 702, MMT 538 presents the user with an upload merchant data file user interface 800 (shown in FIG. 9).

FIG. 9 is an exemplary embodiment of user interface 800 for providing information to the merchant matching process that may be used with MMT 538 (shown in FIG. 5). From upload merchant data file screen 800, the user is able to download a merchant data file template to be filled in with detailed information for each of the issuer's participating merchants to be matched. The merchant data file template is populated by issuers 524 with their list of participating private label merchants 526 for each private label program. From upload merchant data file screen 800, the user is also able to download a merchant data file template by for example, clicking on a link 802 found on the left hand side of upload merchant data file screen 800. When a file download box (not shown) opens the user selects a save button (not shown) and saves the template in a selectable location. Upon saving the merchant data file template the user populates the template with issuers 524 participating merchant 526 information.

Table 1 is an exemplary layout of the merchant data file template.

TABLE 1

| Position | Field Name | Data Type | Description |
|---|---|---|---|
| 1 | FILE_LOCATION_ID | Numeric | The unique merchant identifier assigned by the issuer to each participating merchant. |
| 2 | FILE_DBA_NAME | Alphanumeric | The "Doing Business As" name of the merchant. |
| 3 | FILE_STREET_ADDRESS | Alphanumeric | The merchant's street address. |
| 4 | FILE_CITY | Alphanumeric | The merchant's city. |
| 5 | FILE_STATE_PROVINCE_CODE | Alphanumeric | The merchant's state or province code. |
| 6 | FILE_POSTAL_CODE | Alphanumeric | The merchant's |

TABLE 1-continued

| Position | Field Name | Data Type | Description |
|---|---|---|---|
| | | | postal code. |
| 7 | FILE_TELEPHONE | Numeric | The merchant's telephone number. |
| 8 | FILE_TAX_ID | Numeric | The merchant's tax identification number. |
| 9 | FILE_DUNS_NUMBER | Numeric | The merchant's Dunn & Bradstreet number. |
| 10 | FILE_COUNTRY_CODE | Alphanumeric | The merchant's country code. |
| 11 | LOWER_RANGE (PROGRAM ID) | Numeric (16) | The unique identification number assigned by interchange 512 for each issuer's private label program. This number is the lower bound of the private label account range used for this private label program. |
| 12 | UPPER_RANGE | Numeric (16) | This number is the upper bound of the private label account range used for this private label program. |
| 13 | FILE_STREET_ADDRESS2 | Alphanumeric | The merchant's extended address. (i.e. suite number) |
| 14 | COMPANY_NAME | Alphanumeric | The merchant's name. |

The user then uploads the completed merchant data file template into MMT 538 to initiate the matching process.

The user enters a unique file name for each new list of merchants uploaded into MMT 538 in a unique file name field 804. If the user enters a name that is not unique for the file an error message will notify the user to change the file name. After entering a unique file name, the user then uploads the updated merchant data file template into MMT 538 by browsing to a location on the user's network where the file is stored. Upon successful completion of the file upload process the user will receive notification that the file was successfully uploaded. If the user uploads the merchant data file template into MMT 538 without all the data fields required, a file upload error message is generated informing the user of the missing data. Additionally, if the user attempts to upload the merchant data file template into MMT 538 in an incorrect format, the user will receive an error message. The user then selects a done pushbutton (not shown) on a file upload result screen (not shown), which initiates merchant match processing and the user is able to monitor a progress of the merchant match processing.

Display screen 800 also includes a select type of processing section 806, which includes merchant match only 808, merchant match plus test transaction data 810, and test transaction data only 812. Select type of processing section 806 enables the issuer to select the type of processing or analysis to be performed by MMT 538 on the data being uploaded. Screen 800 also includes an email notification data field 814, which enables the issuer to designate persons that will receive an email notification after each merchant is identified through a test transaction.

In the exemplary embodiment, upon successful completion of the merchant identification process by MMT 538, users will be provided access to different reports generated by MMT 538 depending upon the type of identification analysis being run by MMT 538.

For example, in the case of the merchant matching only analysis, the uploaded file will be matched against the information stored within data warehouse 606 to obtain (CAIDs), and users will be provided access to two specific reports summarizing the results of the match processing, an issuer report and an unmatched summary report. The issuer report provides the user with the list of participating private label merchants which were successfully matched to multi-party card accepting merchant locations. Within this report users are provided with the unique merchant identification numbers (card acceptor IDs) that will accompany authorization requests and clearing messages originating from participating private label merchants. Additionally, users will be provided notification if the merchant's bank is participating in the private label program. If the merchant's bank is not participating in the private label program the merchant will not be able to accept the issuer's private label program card. The unmatched summary report identifies the merchant locations which were unable to be successfully matched to multi-party card accepting merchant locations, thus not enabling assembly of the unique identification numbers for these merchants.

In the case of the test transaction only analysis, MMT 538 will generate a test transaction data report which is an .xls document that includes a card number, an expiration date, and a transaction amount for any merchants designated for this type of processing. When the first test transaction is completed, MMT 538 will locate the test transactions and will create the Issuer Report, wherein as test transactions are identified by MMT 538, the merchant will be listed on the Issuer Report.

In the case of the merchant matching plus test transaction analysis, the uploaded file will be matched against the information stored within data warehouse 606 to obtain (CAIDs), and users will be provided access to three reports: an issuer report, an unmatched summary report, and a test transaction data report. As the test transactions are identified by MMT 538, the merchant will move from the Unmatched Report to the Issuer Report.

In the example embodiment, users are able to access the original file uploaded to MMT 538. By being able to access the data file after uploading, the user (e.g., an issuer) is able to confirm what merchants have been provided to MMT 538 for identification. In another embodiment, users are able to search for merchants without uploading a .csv file to MMT 538. Rather, the system is configured to display a screen (not shown) that prompts the user to input a merchant name and location which is then communicated to MMT 538. MMT 538 receives the entered merchant data and processes it as described herein for identification purposes. This direct inputting of a merchant name and location is beneficial for those cases where an issuer has a relatively small number of merchants that need to be searched and identified.

In another embodiment, the Matched Report generated by MMT 538 will include an additional field showing a "Score" for each merchant identified using the matching process. The score represents an amount of certainty or confidence MMT 538 has in matching the merchant with the particular name and location provided by the issuer. For example, MMT 538 may perform the merchant matching analysis on a merchant name and location uploaded from an issuer. MMT 538 may generate a particular merchant name, location and CAID that "matches" the uploaded data. MMT 538 may further provide a score that represents that MMT 538 is, for example, 90% confident that the generated merchant name, location and CAID is the merchant that was uploaded from the issuer. In some cases, if the score is not sufficiently high enough, the merchant will be included on the Unmatched Report.

Accordingly, in another embodiment of the system, users, such as issuers, are enabled to create two (2) separate Matched Reports based on the score. For example, if the issuer sets a threshold score level of 90%, any merchant having a matching score of greater than 90% will be included on the first Matched Report, and any merchant having a matching score of less than 90% will be included on the second Matched Report. This enables the issuer to create a Matched Report that includes only those merchants that they are adequately certain about from a matching perspective, and another Matched Report that includes certain merchants that may require further processing for identification purposes.

As will be appreciated based on the foregoing specification, the above-described embodiments of the disclosure may be implemented using computer programming or engineering techniques including computer software, firmware, hardware or any combination or subset thereof, wherein the technical effect of the systems and processes described herein is achieved by creating a secure web-based application for entering participating private label merchants' information for the automated matching process, integrating the web application with the multi-party transaction interchange data warehouse for private label merchant data matching. The technical effect is also achieved by automating authorization logs extraction for the merchant matching process, extracting the unique identifiers acquirers have assigned to merchants, delivering the unique identifiers to the private label issuer, and using these unique identifiers to verify that a private label transaction originated at a participating merchant location. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and system of identifying valid private label transactions provides a cost-effective and reliable means for an issuer to uniquely identify participating merchants in the private label transaction system. More specifically, the methods and systems described herein facilitate enabling issuers to extract out of a historical transaction data warehouse the unique card acceptor IDs (merchant identifiers) and acquirer interbank card association (ICA) codes for participating private label card accepting merchants and their merchant banks respectively. In addition, the above-described methods and systems facilitate an automated merchant match and identifier extraction process by comparing the name and address of each participating private label merchant to all multi-party transaction card accepting merchants in the historical transaction data warehouse and selects the matched merchant information. At the completion of merchant matching and ID extraction processing, issuers are provided the unique merchant identifiers for each participating merchant. Once they receive these identifiers, issuers are able to determine if a private label transaction, which is switched via the multi-party transaction system, originates from a participating merchant location. As a result, the methods and systems described herein facilitate enabling issuers to identify when a private label transaction processed by a multi-party transaction card network originated at a participating or non-participant merchant location in a cost-effective and reliable manner.

While the disclosure has been described in terms of various specific embodiments, it will be recognized that the disclosure can be practiced with modification within the spirit and scope of the claims.

What is claimed is:

1. A method of processing a merchant identification request from a private label payment card issuer, the private label payment card issuer communicatively coupled to a multi-party payment card interchange computer device, the interchange computer device coupled to a data warehouse and a merchant matching tool, the data warehouse for storing a plurality of historical multi-party payment card transactions, said method comprising:

transmitting a list of private label merchant locations from the private label payment card issuer to the multi-party payment card interchange computer device, the list including physical location information relating to the private label merchants listed;

processing the private label merchant list by using the interchange computer device to access the merchant matching tool, the merchant matching tool configured to apply an identification analysis including one of merchant matching only, test transaction only, and merchant matching plus test transaction;

identifying, using the interchange computer device, at least one private label merchant location included within the private label merchant list including associating a unique identifier with the at least one identified private label merchant location; and outputting the at least one identified private label merchant location with the associated unique identifier.

2. A method in accordance with claim 1 wherein processing the private label merchant list further comprises applying the merchant matching only analysis to the private label merchant list, wherein the merchant matching only analysis includes:
- retrieving, using the interchange computer device, records of historical multi-party payment card transactions from the data warehouse, the records including physical location information for a merchant initiating each of the transactions and a unique identifier associated with the merchant;
- substantially matching physical location information of the private label merchants included in the list with physical location information from the records of historical multi-party payment card transactions;
- associating the unique identifier associated with the records of historical multi-party payment card transactions with a matching private label merchant location in the list; and
- outputting the matching private label merchant locations and the unique identifier associated with each of the matched locations.

3. A method in accordance with claim 2 wherein matching physical location information of the private label merchants in the list with physical location information from the records of historical multi-party payment card transactions further comprises:
- parsing the physical location information of the private label merchants in the list;
- parsing the physical location information from the records of historical multi-party payment card transactions; and
- intelligently matching corresponding fields in the respective information.

4. A method in accordance with claim 2 wherein matching physical location information of the private label merchants in the list with physical location information from the records of historical multi-party payment card transactions further comprises:
- designating a match threshold;
- calculating a match score for each private label merchant included in the list, the match score representing a confidence level in the corresponding match; and
- flagging private label merchants in the list having physical location information that matches the physical location information from the records of historical multi-party payment card transactions with a match score that is greater than the designated match threshold.

5. A method in accordance with claim 1 wherein processing the private label merchant list further comprises applying the test transaction only analysis to the private label merchant list, wherein the test transaction only analysis includes:
- creating a test transaction data report including test transaction data;
- notifying a selected merchant to process test transaction data at a point of sale (POS) device, the selected merchant included within the list of private label merchants;
- receiving an authorization request at the interchange from the POS device, the authorization request resulting from the processing of the test transaction data at the POS device, the authorization request including a unique identifier associated with the selected merchant;
- identifying the selected merchant based on the received authorization request; and
- outputting a location and the unique identifier of the selected merchant.

6. A method in accordance with claim 5 wherein creating a test transaction data report further comprises:
- determining each private label merchant included on the private label merchant list designated for identification using the test transaction only analysis; and
- generating test transaction data for each private label merchant designated for identification using the test transaction only analysis, the test transaction data including a test transaction card number, an expiration date, and a test transaction amount.

7. A method in accordance with claim 5 wherein receiving an authorization request further comprises:
- processing test transaction data at the POS device of the selected merchant, the test transaction data including a test transaction card number, an expiration date, and a test transaction amount;
- receiving the authorization request at the interchange from the POS device, the authorization request including the test transaction data and a unique identifier associated with the selected merchant;
- detecting the test transaction data at the interchange;
- capturing the unique identifier at the interchange; and
- transmitting a void transaction message to the POS device in response to the authorization request.

8. A method in accordance with claim 5 wherein outputting a location and the unique identifier further comprises:
- automatically transmitting an electronic message from the interchange to the private label payment card issuer each time a test transaction is processed and a selected merchant is identified.

9. A method in accordance with claim 1 wherein processing the private label merchant list further comprises applying a merchant matching plus test transaction analysis to the private label merchant list, wherein the merchant matching plus test transaction analysis includes:
- applying a merchant matching analysis to the private label merchant list to identify a location for at least one of the private label merchants; and
- applying a test transaction analysis to the private label merchants included on the private label merchant list not identified by the merchant matching analysis.

10. A method in accordance with claim 9 wherein applying a merchant matching analysis further comprises:
- retrieving records of historical multi-party payment card transactions from the data warehouse, the records including physical location information for a merchant initiating each of the transactions and a unique identifier associated with the merchant;
- substantially matching physical location information of the private label merchants included in the list with physical location information from the records of historical multi-party payment card transactions;
- associating the unique identifier associated with the records of historical multi-party payment card transactions with a matching private label merchant location in the list; and
- outputting the matching private label merchant locations and the unique identifier associated with each of the matched locations.

11. A method in accordance with claim 9 wherein applying a test transaction analysis further comprises:
- creating a test transaction data report including test transaction data;
- notifying a selected merchant to process test transaction data at a point of sale (POS) device, the selected merchant included within the list of private label merchants;

receiving an authorization request at the interchange from the POS device, the authorization request resulting from the processing of the test transaction data at the POS device, the authorization request including a unique identifier associated with the selected merchant; and identifying the selected merchant based on the received authorization request; and outputting a location and the unique identifier of the selected merchant.

12. A method in accordance with claim 1 further comprising outputting the private label merchant locations that did not match any physical location information from the records of historical multi-party payment card transactions.

13. A method in accordance with claim 1 wherein outputting the at least one identified private label merchant location further comprises:

transmitting the at least one identified private label merchant location with the unique identifier to the private label payment card issuer, the private label payment card issuer being in a private label payment card relationship with the identified private label merchant;

processing at the interchange a private label transaction that is initiated at the at least one identified private label merchant location; and transmitting data associated with the private label transaction from the interchange to the private label payment card issuer for further processing.

14. A method in accordance with claim 1 wherein outputting the at least one identified private label merchant location further comprises outputting at least one report including an issuer report, an unmatched report, and a transaction data report.

15. A network-based system for processing a merchant identification request from a private label payment card issuer, said system comprising:

a point of sale (POS) device;

a computer system associated with the private label payment card issuer;

a database for storing a plurality of historical multi-party payment card transactions; and a server system comprising a merchant matching tool (MMT) and configured to be coupled to said POS device, said computer system, and said database, said server system associated with a multi-party payment card interchange, said server system configured to:

receive a list of private label merchant locations from the issuer computer system, the list including physical location information relating to the private label merchants listed;

process the private label merchant list by applying an identification analysis thereto including one of a merchant matching only analysis, a test transaction only analysis, and merchant matching plus test transaction analysis;

identify at least one private label merchant location included within the private label merchant list including associating a unique identifier with the at least one identified private label merchant location; and output the at least one identified private label merchant location with the associated unique identifier.

16. A system in accordance with claim 15 wherein, when applying the merchant matching only analysis to the private label merchant list, said server is further configured to:

retrieve records of historical multi-party payment card transactions from the database, the records including physical location information for a merchant initiating each of the transactions and a unique identifier associated with the merchant;

substantially match physical location information of the private label merchants included in the list with physical location information from the records of historical multi-party payment card transactions;

associate the unique identifier associated with the records of historical multi-party payment card transactions with a matching private label merchant location in the list; and output the matching private label merchant locations and the unique identifier associated with each of the matched locations.

17. A system in accordance with claim 16 wherein, when applying the merchant matching only analysis to the private label merchant list, said server system is further configured to:

parse the physical location information of the private label merchants included in the list;

parse the physical location information from the records of historical multi-party payment card transactions; and intelligently match corresponding fields in the respective information.

18. A system in accordance with claim 16 wherein, when applying the merchant matching only analysis to the private label merchant list, said server system is further configured to:

designate a match threshold;

calculate a match score for each private label merchant included in the list, the match score representing a confidence level in the corresponding match; and flag private label merchants in the list having physical location information that matches the physical location information from the records of historical multi-party payment card transactions with a match score that is greater than the designated match threshold.

19. A system in accordance with claim 15 wherein, when applying the test transaction only analysis to the private label merchant list, said server system is further configured to:

select a merchant from the private label merchant list that is designated for test transaction only analysis, the selected merchant associated with the POS device;

create test transaction data for the selected merchant;

receive an authorization request from the POS device, the authorization request resulting from the processing of the test transaction data at the POS device, the authorization request including a unique identifier associated with the selected merchant;

identify the selected merchant based on the received authorization request; and output a location and the unique identifier of the selected merchant.

20. A system in accordance with claim 19 wherein said server system is further configured to:

determine each private label merchant included on the private label merchant list designated for identification using the test transaction only analysis; and generate test transaction data for each private label merchant designated for identification using the test transaction only analysis, the test transaction data including a test transaction card number, an expiration date, and a test transaction amount.

21. A system in accordance with claim 19 wherein said server system is further configured to:

receive the authorization request from the POS device, the authorization request resulting from the POS device processing test transaction data of a selected merchant, the test transaction data including a test transaction card number, an expiration date, and a test transaction amount;

detect the test transaction data;

capture the unique identifier; and transmit a void transaction message to the POS device in response to the authorization request.

22. A system in accordance with claim 19 wherein said server system is further configured to automatically transmit an electronic message to the issuer computer system each time a test transaction is processed and a selected merchant is identified.

23. A system in accordance with claim 15 wherein said server system is further configured to:

apply a merchant matching analysis to the private label merchant list to identify a location for at least one of the private label merchants; and apply a test transaction analysis to the private label merchants included on the private label merchant list not identified by the merchant matching analysis.

24. A system in accordance with claim 23 wherein said server system is further configured to:

retrieve records of historical multi-party payment card transactions from the database, the records including physical location information for a merchant initiating each of the transactions and a unique identifier associated with the merchant;

substantially match physical location information of the private label merchants included in the list with physical location information from the records of historical multi-party payment card transactions;

associate the unique identifier associated with the records of historical multi-party payment card transactions with a matching private label merchant location in the list; and output the matching private label merchant locations and the unique identifier associated with each of the matched locations.

25. A system in accordance with claim 23 wherein said server system is further configured to:

select a merchant from the private label merchant list that is designated for test transaction analysis, the selected merchant associated with the POS device;

create test transaction data for the selected merchant;

receive an authorization request from the POS device, the authorization request resulting from the processing of the test transaction data at the POS device, the authorization request including a unique identifier associated with the selected merchant;

identify the selected merchant based on the received authorization request; and output a location and the unique identifier of the selected merchant.

26. A system in accordance with claim 15 wherein said server system is further configured to output the private label merchant locations that did not match any physical location information from the records of historical multi-party payment card transactions.

27. A system in accordance with claim 15 wherein said server system is further configured to:

transmit the at least one identified private label merchant location with the unique identifier to said issuer computer system, the private label payment card issuer being in a private label payment card relationship with the identified private label merchant;

process a private label transaction that is initiated at the at least one identified private label merchant location; and transmit data associated with the private label transaction to the issuer computer system for further processing.

28. A system in accordance with claim 15 wherein said server system is further configured to output at least one report including an issuer report, an unmatched report, and a transaction data report.

29. A computer program embodied on a computer readable medium for processing a merchant identification request from a private label payment card issuer, the private label payment card issuer communicatively coupled to a multi-party payment card interchange computer that is coupled to a data warehouse, the data warehouse for storing a plurality of historical multi-party payment card transactions, said program is executed by the interchange computer and comprises at least one code segment that:

receives a list of private label merchant locations from the private label payment card issuer, the list including physical location information relating to the private label merchants listed;

processes the private label merchant list by applying an identification analysis thereto including applying one of a merchant matching only analysis, a test transaction only analysis, and merchant matching plus test transaction analysis;

identifies at least one private label merchant location included within the private label merchant list including associating a unique identifier with the at least one identified private label merchant location; and outputs the at least one identified private label merchant location with the associated unique identifier.

30. A computer program in accordance with claim 29 further comprising at least one code segment that, when applying the merchant matching only analysis to the private label merchant list:

retrieves records of historical multi-party payment card transactions from the data warehouse, the records including physical location information for a merchant initiating each of the transactions and a unique identifier associated with the merchant;

substantially matches physical location information of the private label merchants included in the list with physical location information from the records of historical multi-party payment card transactions;

associates the unique identifier associated with the records of historical multi-party payment card transactions with a matching private label merchant location in the list; and outputs the matching private label merchant locations and the unique identifier associated with each of the matched locations.

31. A computer program in accordance with claim 30 further comprising at least one code segment that, when applying the merchant matching only analysis to the private label merchant list:

parses the physical location information of the private label merchants in the list;

parses the physical location information from the records of historical multi-party payment card transactions; and intelligently matches corresponding fields in the respective information.

32. A computer program in accordance with claim 30 further comprising at least one code segment that, when applying the merchant matching only analysis to the private label merchant list:

designates a match threshold;

calculates a match score for each private label merchant included in the list, the match score representing a confidence level in the corresponding match; and flags private label merchants in the list having physical location information that matches the physical location information from the records of historical multi-party payment card transactions with a match score that is greater than the designated match threshold.

33. A computer program in accordance with claim 29 further comprising at least one code segment that, when applying the test transaction only analysis to the private label merchant list:

selects a merchant from the private label merchant list that is designated for test transaction only analysis, the selected merchant associated with a point of sale (POS) device;

creates test transaction data for the selected merchant;

receives an authorization request from the POS device, the authorization request resulting from the processing of the test transaction data at the POS device, the authorization request including a unique identifier associated with the selected merchant;

identifies the selected merchant based on the received authorization request; and outputs a location and the unique identifier of the selected merchant.

34. A computer program in accordance with claim 33 further comprising at least one code segment that:

determines each private label merchant included on the private label merchant list designated for identification using the test transaction only analysis; and generates test transaction data for each private label merchant designated for identification using the test transaction only analysis, the test transaction data including a test transaction card number, an expiration date, and a test transaction amount.

35. A computer program in accordance with claim 33 further comprising at least one code segment that:

receives the authorization request from the POS device, the authorization request resulting from the POS device processing test transaction data of the selected merchant, the test transaction data including a test transaction card number, an expiration date, and a test transaction amount;

detects the test transaction data;

captures the unique identifier; and transmits a void transaction message to the POS device in response to the authorization request.

36. A computer program in accordance with claim 33 further comprising at least one code segment that transmits an electronic message from the interchange to the private label payment card issuer each time a test transaction is processed and a selected merchant is identified.

37. A computer program in accordance with claim 29 further comprising at least one code segment that, when applying a merchant matching plus test transaction analysis to the private label merchant list:

applies a merchant matching analysis to the private label merchant list to identify a location for at least one of the private label merchants; and applies a test transaction analysis to the private label merchants included on the private label merchant list not identified by the merchant matching analysis.

38. A computer program in accordance with claim 29 further comprising at least one code segment that:

transmits the at least one identified private label merchant location with the unique identifier to the private label payment card issuer, the private label payment card issuer being in a private label payment card relationship with the identified private label merchant;

processes a private label transaction that is initiated at the at least one identified private label merchant location; and transmits data associated with the private label transaction from the interchange to the private label payment card issuer for further processing.

\* \* \* \* \*